United States Patent [19]

Hossain et al.

[11] Patent Number: 5,009,746
[45] Date of Patent: Apr. 23, 1991

[54] METHOD FOR REMOVING STICKIES FROM SECONDARY FIBERS USING SUPERCRITICAL $CO_2$ SOLVENT EXTRACTION

[75] Inventors: Shafi U. Hossain, Menasha, Wis.; Carol A. Blaney, Roswell, Ga.

[73] Assignee: Kimberly-Clark Corporation, Neenah, Wis.

[21] Appl. No.: 596,819

[22] Filed: Oct. 12, 1990

[51] Int. Cl.$^5$ .................. D21C 9/08; D21C 5/02
[52] U.S. Cl. ............................ 162/5; 162/63; 162/DIG. 4
[58] Field of Search ............... 162/4, 5, DIG. 4, 63

[56] References Cited

U.S. PATENT DOCUMENTS

| | | | |
|---|---|---|---|
| 3,058,871 | 10/1962 | Davis | 162/5 |
| 4,061,566 | 12/1977 | Modell | |
| 4,113,446 | 9/1978 | Modell et al. | |
| 4,147,624 | 4/1979 | Modell | |
| 4,193,838 | 3/1980 | Kelly et al. | 162/5 |
| 4,263,253 | 4/1981 | Pilz et al. | |
| 4,308,200 | 12/1981 | Fremont | |
| 4,338,199 | 7/1982 | Modell | |
| 4,466,923 | 8/1984 | Friedrich | |
| 4,472,442 | 9/1984 | Katz | |
| 4,493,797 | 1/1985 | Avedesian | |
| 4,495,095 | 1/1985 | Lawson et al. | |
| 4,543,190 | 9/1985 | Modell | |
| 4,550,198 | 10/1985 | Myerson | |
| 4,554,170 | 11/1985 | Panzner et al. | |
| 4,564,458 | 1/1986 | Burleson | |
| 4,594,164 | 6/1986 | Titmas | |
| 4,647,466 | 3/1987 | Japikse et al. | |
| 4,675,198 | 6/1987 | Sevenants | |
| 4,703,060 | 10/1987 | Traitler et al. | |
| 4,728,525 | 3/1988 | Toro et al. | |
| 4,767,634 | 8/1988 | Kaleda et al. | |

FOREIGN PATENT DOCUMENTS

| | | |
|---|---|---|
| 314223 | 5/1989 | European Pat. Off. |
| WO81/00854 | 4/1981 | PCT Int'l Appl. |
| WO81/00855 | 4/1981 | PCT Int'l Appl. |

OTHER PUBLICATIONS

Brady et al., "Supercritical Extraction of Toxic Organics from Soils", Ind. Eng. Chem. Res., 1987, vol. 26, pp. 261-268.
Dooley et al., EPA Report No. 600/9-87/018F, pp. 383-397.
Eckert et al., Environ. Sci. Technol., 1986, vol. 20, pp. 319-325.
Groves et al., CRC Critical Reviews in Environmental Control, 1985, vol. 15, pp. 237-274.
Hatakeda et al., Nipon Kagaku Kaishi, 1987, No. 5, pp. 931-933.
Hawthorne et al., J. Chromatogr., 1987, vol. 403, pp. 63-76.
Hawthorne et al., Anal. Chem., 1987, vol. 59, pp. 1705-1708.
Li et al., Ind. Eng. Chem. Res., 1988, vol. 27, pp. 1301-1312.
Modell, M., Fundam. Thermochem. Biomass Convers., 1985, pp. 95-119.
Pang et al., Ind. Eng. Chem. Process. Des. Dev., 1985, vol. 24, pp. 1027-1032.
Ritter and Campbell, Biotechnology and Bioengineering Symp., 1986, No. 17, pp. 179-182.
Schneiderman et al., J. Chromatogr., 1987, vol. 409, pp. 343-353.
Shishikura et al., J. Jpn. Oil Chem. Soc., 1988, vol. 37, pp. 8-12.
West et al., Can. J. Chem. Eng., 1987, vol. 65, pp. 645-650.
Chemosphere—Chlorinated Dioxins and Related Compounds 1987, McNelis et al. eds., Pergamon Press, N.Y., vol. 18, Nos. 1-6, 1989, p. 50.
Suprex Publication No. TN-022, Suprex Corporation, Pittsburgh, Pa., 1989.

Primary Examiner—Karen M. Hastings
Attorney, Agent, or Firm—William D. Herrick

[57] ABSTRACT

A process for removing sticky contaminants ("stickies") from cellulose-containing fibers such as waste paper is provided. The process comprises contacting the fibers with supercritical or near supercritical carbon dioxide for a period of time sufficient to extract a substantial portion of the stickies without substantially damaging the fibers.

15 Claims, 2 Drawing Sheets

METHOD FOR REMOVING STICKIES FROM SECONDARY FIBERS USING SUPERCRITICAL CO₂ SOLVENT EXTRACTION

BACKGROUND OF THE INVENTION

The present invention relates to the use of supercritical or near supercritical carbon dioxide to remove sticky contaminants (hereinafter referred to as "stickies") from secondary fibers.

As known in the art, secondary fibers comprise materials, usually cellulose-based, which have been used at least once in their intended primary use area but are, nevertheless, amenable to further processing and subsequent reuse. Waste paper, newsprint, ledger stock, packaging materials, cartons, boxes, computer printouts, telephone directories, corrugated boards, and the like represent suitable raw stock for conversion to secondary fibers. The pattern of reuse (i.e., use of the secondary fiber) may not always be similar to the use to which the primary (virgin) fiber was put.

Efficient management of solid wastes, of which cellulose-based materials constitute a significant part (e.g., waste paper, 40%; yard waste, 18%), has become an important societal theme. In recent years, efforts to recycle waste paper have intensified with the ever increasing concerns as to the rate of use of raw materials and the possible adverse environmental impact of common industrial processes. Novel screening systems and sophisticated flotation techniques have emerged which in large measure have successfully addressed the problem of de-inking printed stock. New bleaching sequences which avoid the use of chlorine or chlorine compounds and rely solely upon hydrogen peroxide, dithionites, or formamidine sulfinic acid for attaining acceptable levels of brightness are also making their appearance.

One aspect of waste paper reuse, however, has remained a continuing problem both with regard to machine operability and with regard to product quality. This area is the presence of sticky contaminants in the stock used to prepare the secondary fibers.

Stickies consist primarily of organic adhesives used in the paper converting industry, such as, hot melts, pressure-sensitive adhesives, styrofoam, and latices. Typical stickies include: polyvinyl acetate (PVA) polymers and copolymers, ethylene vinyl acetate (EVA) polymers and copolymers, polystyrene, styrene-butadiene, polypropylene, polyethylene, polyamide, latex and other rubber compounds, wax, and the like. A particularly common source of stickies is the tackifiers which are added to paper products to improve adhesion properties.

When waste paper containing these adhesives/tackifiers are defibered, stickies are broken down into particles having a wide range of sizes, e.g., less than 0.074 millimeters to greater than 0.42 millimeters. Inefficient removal of stickies causes off-quality paper (e.g., poor appearance, lower strength, and/or holes) and paper machine downtime (e.g., web breaks, slippery sheets, and/or deposition of stickies on such machine components as wires, felts, presses, rolls, and/or drying cylinders).

In an effort to deal with these problems various chemical and mechanical means have been considered. For example, talc and zirconium oxide have been used as pacification agents for stickies. High temperatures, high pressures, and/or solvent addition have been employed as dispersion techniques. Reverse hydroclones and throughflow cleaners have been used to try to screen and/or clean stickies from the feed stock.

Also, efforts have been made to select the stock used for recycling ("furnish selection"). In general, furnish selection is not cost effective. Also, as fiber recycling becomes more important in the context of environmental concerns, the furnish itself will tend to become less "virgin" and more of secondary and tertiary origin, which will, in turn, seriously aggravate the stickies problem.

Notwithstanding these wide ranging efforts, the removal of stickies remains an unsolved problem in the area of fiber recycling. As recognized in the art, irrespective of the technique used, some stickies end up in the paper machine headbox where they adversely affect machine runability and product quality. Accordingly, there is an important and continuing need to remove or substantially reduce the content of stickies in waste paper stock which is going to be recycled. It is an object of the present invention to respond to this need.

Various uses of supercritical fluids in the processing of materials have been disclosed in the literature. For example, supercritical carbon dioxide has been used to remove tall oil and turpentine from coniferous woods in Fremont, U.S. Pat. No. 4,308,200, to extract lignin from the black liquor produced by the Kraft process for pulp production in Avedesian, U.S. Pat. No. 4,493,797, to treat refinery sludges in European Patent Publication No. 314,223, to regenerate absorbents used in waste water treatment systems in Modell, U.S. Pat. Nos. 4,061,566 and 4,147,624, to sterilize pharmaceuticals in Pilz et al., U.S. Pat. No. 4,263,253, to remove off-flavor materials from textured vegetable products in Sevenants, U.S. Pat. No. 4,675,198, to remove gamma-linolenic acid from fruit seeds in Traitler et al., U.S. Pat. No. 4,703,060, and to decaffeinate coffee in Katz, U.S. Pat. No. 4,472,442; Toro et al., U.S. Pat. No. 4,728,525 and Kaleda et al., U.S. Pat. No. 4,767,634. See also, Friedrich, U.S. Pat. No. 4,466,923; Lawson et al., U.S. Pat. No. 4,495,095; Myerson, U.S. Pat. No. 4,550,198; Panzner et al., U.S. Pat. 4,554,170; Japikse et al., U.S. Pat. No. 4,647,466; Ritter and Campbell, "The Effects of Supercritical Carbon Dioxide Extraction on Pine Wood Structure", *Biotechnology and Bioengineering Symp.*, 1986, no. 17, pp. 179-182; Hatakeda et al., "Extraction of Sugi (Cryptomeria japonica D. Don) with supercritical carbon dioxide", *Nipon Kagaku Kaishi*, 1987, no. 5, pp. 931-933; Shishikura et al., "Concentration of Tocopherols from Soybean Sludge by Supercritical Fluid Extraction", *J. Jpn. Oil Chem. Soc.*, 1988, vol. 37, pp. 8-12; and Li and Kiran "Interaction of Supercritical Fluids with Lignocellulosic Materials", *Ind. Eng. Chem. Res.*, 1988, vol. 27, pp. 1301-1312.

Similarly, supercritical water or near supercritical water has been used to treat wood chips and black liquor from pulping in Modell, PCT Patent Publication No. WO 81/00855. See also Modell M., "Gasification and Liquefaction of Forest Products in Supercritical Water", *Fundam. Thermochem. Biomass Convers.*, 1985, pp. 95-119; and West et al., "Pyrolysis of 1,3-butanediol as a model reaction for wood liquefaction in supercritical water", *Can. J. Chem. Eng.*, 1987, vol. 65, pp. 645-650.

A review of the use of supercritical fluids, including supercritical carbon dioxide in various industrial and pollution control processes can be found in Eckert et al., "Supercritical fluid processing", *Environ. Sci. Technol.*, 1986, vol 20, pp. 319-325. Other studies involving the use of supercritical fluids including carbon dioxide to remove organic materials, in particular, hazardous organic materials, from environmental solids can be found in Pang et al., "Supercritical Extraction of Aromatic Hydrocarbon Solids and Tar and Bitumens", *Ind. Eng. Chem. Process. Des. Dev.*, 1985, vol. 24, pp. 1027-1032, Groves et al. "State-of-the-art on the supercritical extraction of organics from hazardous wastes", *CRC Critical Reviews in Environmental Control*, 1985, vol. 15, pp. 237-274; Hawthorne et al., "Extraction and Recovery of Polycyclic Aromatic Hydrocarbons from Environmental Solids Using Supercritical Fluids", *Anal. Chem.*, 1987, vol. 59, pp. 1705-1708; Dooley et al., "Supercritical Fluid Extraction and Catalytic Oxidation of Toxic Organics from Soils", *EPA Report No. 600/9-87/018F*, pp. 383-397; and Brady et al. "Supercritical Extraction of Toxic Organics from Soils", *Ind. Eng. Chem. Res.*, 1987, vol. 26, pp. 261-268.

Along these same lines, U.S. Pat. Nos. 4,338,199 and 4,543,190 to Modell describe a process in which organic materials are oxidized in supercritical water. The '199 patent includes a general statement that its process can be used to remove toxic chemicals from the wastes generated by a variety of industries including forest product wastes and paper and pulp mill wastes. The use of supercritical water to treat organic waste materials is also disclosed in PCT Patent Publication No. WO 81/00854, Modell et al., U.S. Pat. No. 4,113,446, Burleson, U.S. Pat. No. 4,564,458, and Titmas, U.S. Pat. No. 4,594,164. A summary of experiments performed by Modar, Inc., using the Modell supercritical water process was published in *Chemosphere—Chlorinated Dioxins and Related Compounds* 1987, McNelis et al., editors, Pergamon Press, New York, 1989, Vol. 18, Nos. 1-6, page 50.

In addition to their use in materials processing and waste treatment, supercritical fluids have been used in connection with various analytic procedures. For example, Suprex Publication No. TN-022, Suprex Corporation, Pittsburgh, Pa., 1989, mentions the use of supercritical carbon dioxide as part of an analytical procedure for assaying dioxins. Similarly, Hawthorne et al., "Directly coupled supercritical fluid extraction-gas chromatographic analysis of polycyclic aromatic hydrocarbons and polychlorinated biphenyls from environmental solids" *J. Chromatogr.*, 1987, vol. 403, pp. 63-76, discuss the use of supercritical fluid extraction coupled to a gas chromatograph to analyze environmental solids, e.g., urban dust, for organic pollutants, specifically, polycyclic aromatic hydrocarbons. Along similar lines, Schneiderman et al., "Determination of anthraquinone in paper and wood using supercritical fluid extraction and high-performance liquid chromatography with electrochemical detection", *J. Chromatogr.*, 1987, 409, pp. 343-353, describe the combination of supercritical fluid extraction using carbon dioxide, high-performance liquid chromatography, and electrochemical detection to analyze Kraft paper and pine plywood sawdust for anthraquinone.

Significantly, none of these references in any way discloses or suggests that the problem of removing stickies from secondary fibers can be solved by treating the fibers with supercritical carbon dioxide.

SUMMARY OF THE INVENTION

In view of the foregoing state of the art, it is an object of the present invention to provide a method for removing stickies from secondary fibers. In particular, it is an object of the invention to provide a method for removing stickies from such fibers which is cost-effective, simple to perform, and which will not deleteriously affect the desirable and marketable attributes of the fibers after treatment.

To achieve the foregoing and other objects, the invention provides a method for removing stickies from secondary fibers which comprises contacting the secondary fibers with supercritical or near supercritical carbon dioxide for a period of time at a temperature, pressure, and carbon dioxide flow rate such that (1) a substantial reduction in the level of stickies associated with the fibers is achieved, and (2) the properties of the fibers, e.g., their physical and chemical properties, are not substantially degraded.

In general terms, substantial levels of stickies extraction in combination with low levels of fiber degradation are achieved for pressures above about 60 atmospheres, preferably in the range of from about 73 atmospheres to about 300 atmospheres, and most preferably from about 80 atmospheres to about 200 atmospheres, temperatures above about 25° C. preferably in the range from about 31° C. to about 150° C., and most preferably from about 31° C. to about 90° C., carbon dioxide flow rates in the range from about 0.01 standard liters/minute/gram of dry secondary fiber (slpm/gm) to about 10 slpm/gm, preferably from about 0.1 slpm/gm to about 1.0 slpm/gm, and processing periods of from about 1 minute to about 3 hours, preferably from about 3 minutes to about 1 hour, for the foregoing flow rates. In terms of solvent-to-feed ratios, the preferred range is from about 10 to about 200 grams of carbon dioxide per gram of dry secondary fiber. These ranges, of course, may vary depending upon the particular equipment used to perform the extraction and the particular characteristics of the secondary fibers being treated. The specific parameters for any particular application can be readily determined by persons skilled in the art from the disclosure herein.

As demonstrated by the experimental data presented below, using processing conditions within the foregoing ranges, on the order of one-fourth to one-third of the stickies in a typical sample of secondary fibers were removed. In view of the difficulties involved in removing stickies from waste papers, this is considered to be a substantial extraction level.

The accompanying drawings, which are incorporated in and constitute part of the specification, illustrate a preferred embodiment of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to the extraction of sticky contaminants from secondary fibers.

The invention can be applied to secondary fibers from a variety of sources including waste paper, newsprint, ledger stock, packaging materials, cartons, boxes, computer printouts, telephone directories, corrugated boards, and the like. In general, the major constituent of the fibers will be cellulose. The fibers can include other organic materials. Also, clays and other filler materials used in the paper manufacturing process can be present. Typically, the material being treated will include at least some fiber which was exposed to a tackifier and/or an adhesive.

The extraction process of the invention is preferably applied to the secondary fibers prior to other steps in the reclamation (recycling) procedure and, in particular, prior to being subjected to conventional de-inking/bleaching processes. However, if desired, the process can be applied after de-inking and whitening have been performed. As used herein, the term "secondary fibers" is intended to include fibers at any stage of the reclamation process, i.e., from the raw waste material stage to the ready-for-the-second-use stage.

Figure 1:
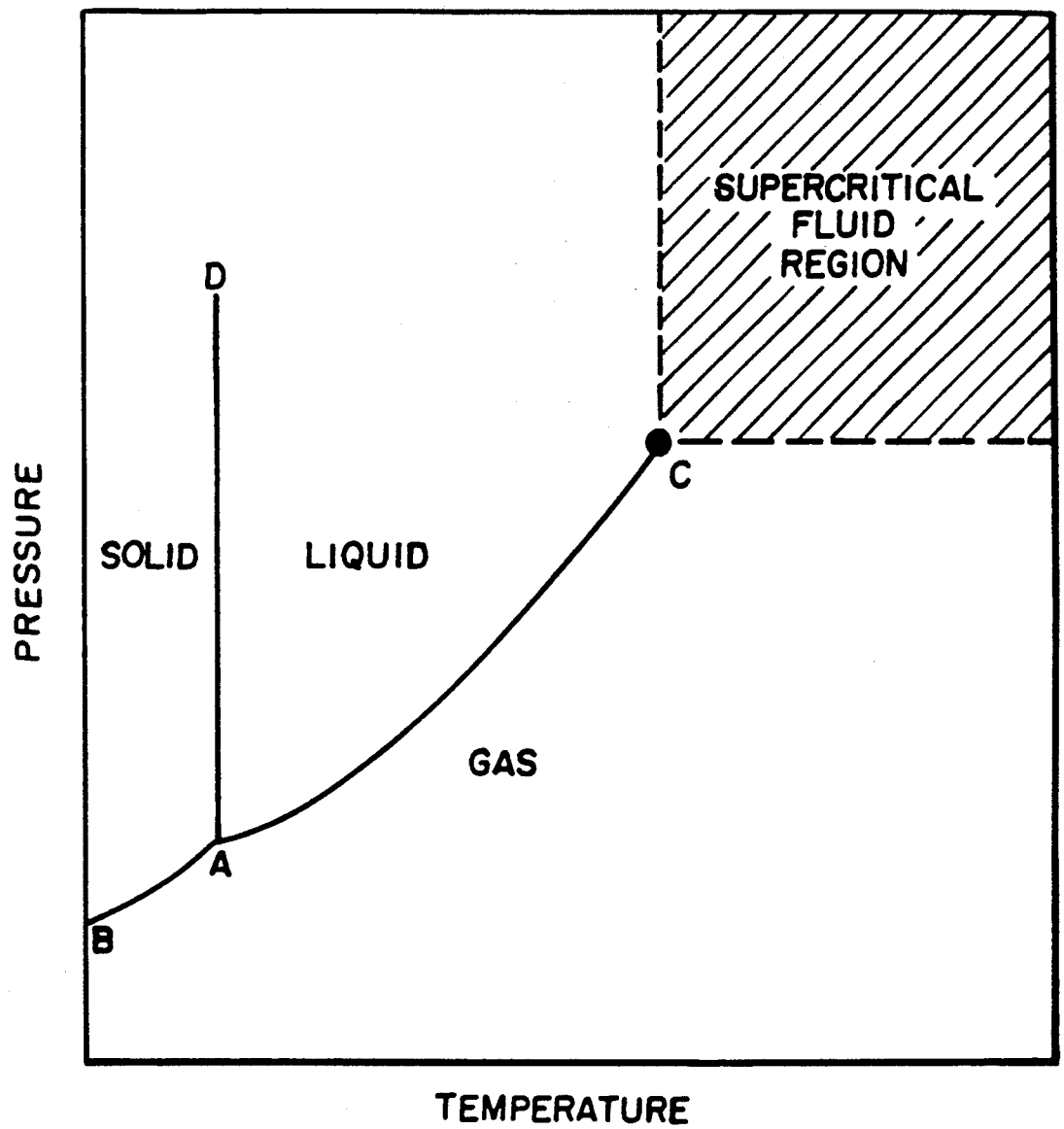
FIG. 1 is a pressure-temperature diagram illustrating carbon dioxide's supercritical fluid region.

The extraction is performed using supercritical or near supercritical carbon dioxide. The three commonly encountered states or phases of matter are solid, liquid, and gas. Depending upon the ambient conditions (e.g., pressure/temperature), the three phases can exist singly or in equilibrium with other phases. The phase diagram of FIG. 1 illustrates the relationship between these phases for a pure substance, i.e., for pure carbon dioxide. The curves AB, AC, and AD represent the boundaries separating single phases. These curves are known as "coexistence curves" since the phases exist in equilibrium along these curves. Specifically, curve AB is the solid/gas equilibrium curve, curve AC is the liquid/gas equilibrium curve, and curve AD is the solid/liquid equilibrium curve. For simplicity, the curves are often termed the sublimation, vapor pressure, and melting curves.

Point A of FIG. 1 is known a the triple point where all three phases coexist in equilibrium. Point C, the end point of the vapor pressure curve, is known a the gas-liquid critical point where the distinction between gas and liquid disappears. The temperature and the pressure at the critical point are known as the critical temperature ($T_c$) and the critical pressure ($P_c$). No gas can be liquefied above its $T_c$, no matter how great the pressure. The shaded region in FIG. 1 is known as the supercritical fluid state, and a substance existing in that region (i.e., a substance which has been heated above its $T_c$ and compressed beyond its $P_c$) is termed a supercritical fluid (SCF).

In the supercritical state, substances behave partly as a gas and partly as a liquid. Their densities are liquid-like but in respect of diffusivity or penetration capability they resemble gases. The density of a supercritical fluid may be continuously changed without phase separation by changes in pressure and/or temperature. Density dependent properties such as solvent power also undergo corresponding changes. For example, when water is in the supercritical state ($T_c = 374°$ C. and $P_c = 218$ atm), it tends to lose its hydrogen-bonding characteristics, its dielectric constant tends to suffer a dramatic decline, and it tends to become miscible with certain hydrocarbons such as benzene.

As discussed above, the present invention uses supercritical or near supercritical carbon dioxide to remove stickies from secondary fibers. The critical temperature and pressure for pure carbon dioxide are 31° C. and 72.9 atmospheres, respectively. Of course, as used in the present invention, carbon dioxide is not operating in a simple, pure state, but as part of a multi-component system. It is possible, therefore, that depending upon the particular system, the advantages of the invention can be achieved even though the pressures and/or the temperatures used are not above the critical values for pure carbon dioxide. It is in this sense that the phrase "near supercritical" is used herein.

Figure 2:
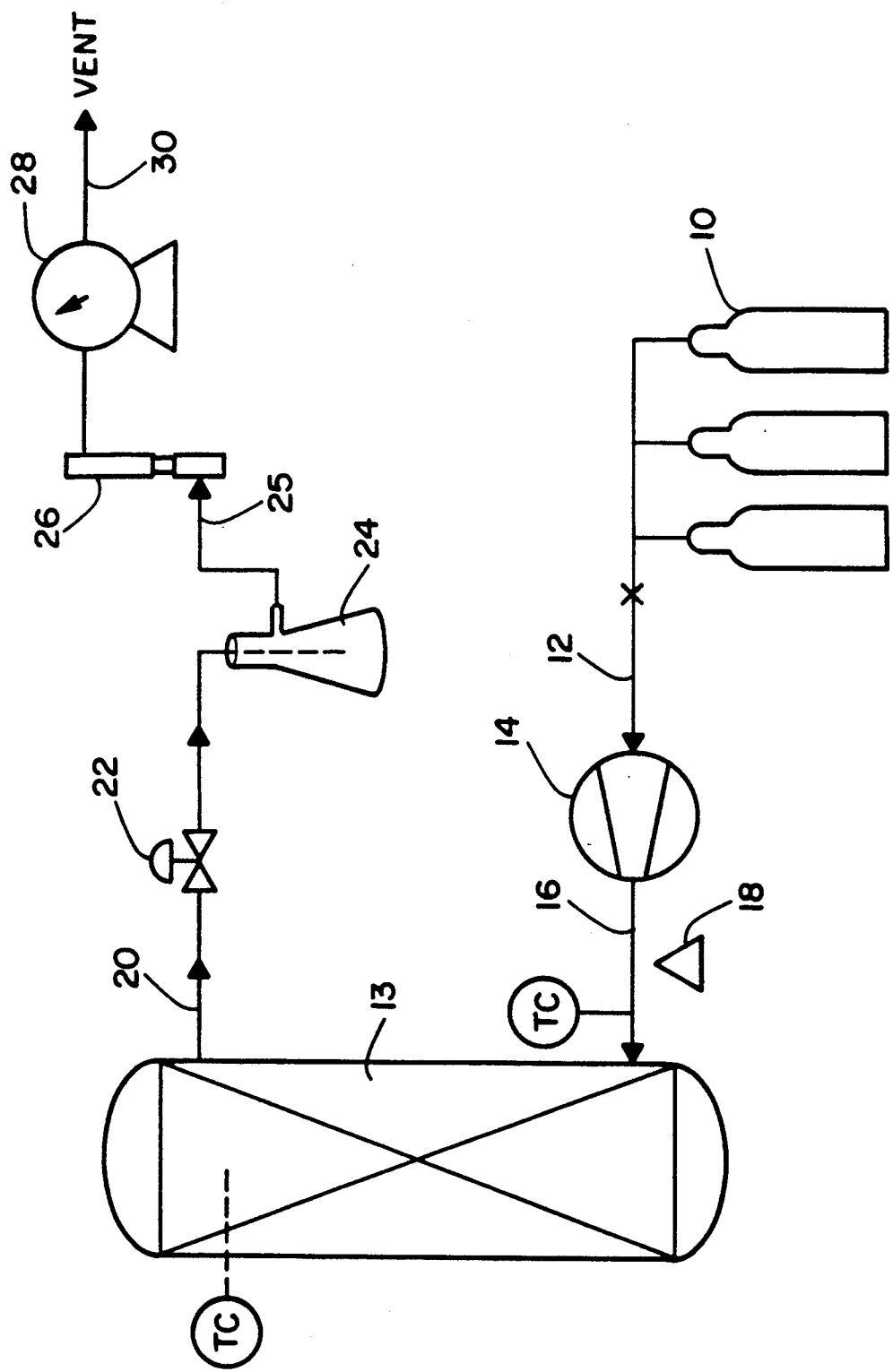
FIG. 2 illustrates representative equipment which can be used in the practice of the invention.

FIG. 2 shows representative apparatus for practicing the invention in a batch mode. It should be noted that apparatus other than that shown in FIG. 2 can be used to practice the invention. In particular, the literature references and patent publications discussed above disclose various equipment configurations which can be used in extraction processes employing supercritical fluids. The use of such equipment with the present invention will be evident to persons of ordinary skill in the art from the disclosure herein. It should also be noted that the invention can be practiced in a flow-through mode, rather than a batch mode.

In the system of FIG. 2, carbon dioxide from supply 10 is fed through conduit 12 to compressor 14 which raises the pressure of the carbon dioxide above its critical pressure. The compressed carbon dioxide is then passed through conduit 16 where it is heated above its critical temperature by heating tape 18.

The supercritical carbon dioxide then enters extraction vessel 13 which has been previously loaded with secondary fibers. Vessel 13 will normally include heating means (not shown) to maintain the temperature of the carbon dioxide above its critical temperature. Vessel 13 will also be constructed to operate at pressures above the critical pressure of carbon dioxide.

As the supercritical carbon dioxide passes through vessel 13 it extracts stickies from the secondary fibers. The supercritical carbon dioxide with its load of contaminants leaves vessel 13 by means of conduit 20 and passes through pressure reduction valve 22 which reduces the pressure of the carbon dioxide. As a result, the stickies precipitate out of the carbon dioxide and are collected in collector 24. If desired, the stickies in the carbon dioxide stream can be captured on a solid support by passing the stream through, for example, a bed of activated carbon, clay, or the like. The stickies can subsequently be removed from the bed by, for example, heating the bed to a temperature at which the stickies will fully decompose.

After the stickies have been removed, the carbon dioxide stream leaves collector 24 through conduit 25 and passes through flow meter 26 and dry test meter 28. Dry test meter 28 is used to measure accumulative gas flow. Flow meter 26 is used to measure the flow rate of carbon dioxide through the system. As discussed above, the preferred flow rate is in the range of from about 0.01 to about 10 slpm/gm of dry secondary fiber. Based on the readings obtained from flow meter 26, pressure reduction valve 22 (or alternatively a separate flow controlling valve) is adjusted to achieved the desired flow rate.

As shown in FIG. 2, after passing through dry test meter 28, the carbon dioxide is vented to the atmosphere. Alternatively, the carbon dioxide can be collected and recycled through compressor 14.

Without intending to limit it in any manner, the present invention will be further illustrated by the following example.

Example

In overview, the experimental method used to demonstrate the ability of supercritical carbon dioxide to remove stickies from secondary fibers involved measuring the levels of ethanol/benzene, acetone, and methylene chloride extractables in waste paper samples before and after supercritical fluid extraction (SCFE).

The waste paper used was obtained from Kimberly-Clark Corporation (Neenah, Wis.) and was representative of typical stickies-containing secondary fibers. I contained approximately half softwood and half hardwood. The samples were shredded prior to extraction.

The extraction was carried out using the apparatus shown in FIG. 2. Extraction vessel 13 had a capacity of 3.0 liters, was made of stainless steel and wa electrically heated. The system was fitted with suitable instrumentation for measurement of temperature and pressure throughout the process.

A sample, approximately 429 grams in weight, of the shredded waste paper was placed in the extraction vessel, sandwiched between layers of glass wool. A total extraction period of six hours was used. During the first three hours, carbon dioxide was passed through the system at the rate of approximately 16 standard liters per minute measured at 21° C. and 1.0 atmosphere so as to give a flow rate per gram of approximately 0.04 slpm/gm. During the second three hours, the carbon dioxide flow rate was increased to approximately 29 slpm corresponding to a flow rate per gram of approximately 0.07 slpm/gm. The overall solvent-to-feed ratio was thus approximately 34 grams $CO_2$ per gram of sample. Throughout the process, the pressure was maintained between 4700 and 5000 psia and the temperature between 66° C. and 74° C. As indicated above, $T_c$ and $P_c$ for $CO_2$ are 31° C. and 1072 psia, respectively.

Samples of the supercritical fluid extracted material (SCFE) and the material prior to supercritical extraction (the "control") were separately Soxhlet extracted with various liquid solvents to determine the percentages of the liquid solvent extractables which were removed by the extraction process. Spectra of the extracts (solvent-cast films) were then obtained via fourier transformed infra red (FTIR) analysis to identify the extractables. Two replicate analyses were performed on each sample.

The results of this experiment ar shown in Table 1. As shown therein, supercritical carbon dioxide removed approximately one-fourth t one-third of the ethanol-benzene extractables, the acetone extractables, and the methylene chloride extractables.

The extractables were determined via FTIR to be mostly styrene-butadiene rubbers and polyvinyl acetate, i.e. they were determined to be typical stickies. Accordingly, these results show that supercritical carbon dioxide extraction can produce substantial reductions in the level of sticky contaminants in secondary fibers.

TABLE 1

RESULTS FROM SC—$CO_2$ EXTRACTION OF STICKIES FROM SECONDARY FIBERS - WEIGHT PERCENT EXTRACTIVES, DRY BASIS[1]

| | Liquid Solvent Used in Soxhlet Extraction | | |
|---|---|---|---|
| | Ethanol Benzene | Acetone | Methylene Chloride |
| "Control" | 0.61 | 0.53 | 0.44 |
| (Secondary Fibers before SCFE) "SCFE" (Secondary Fibers after SCFE) | 0.44 | 0.37 | 0.34 |
| % Extractables Removed by SCFE Process | 28% | 30% | 23% |

[1]FTIR spectra show that all residues contained predominantly styrene-butadiene rubber and polyvinyl acetate.

What is claimed is:

1. A method for reducing the level of sticky contaminants in cellulose-containing secondary fibers containing sticky contaminants comprising contacting the fibers with carbon dioxide under pressure and temperature conditions such that the carbon dioxide is a supercritical or near supercritical fluid and for a period of time sufficient to reduce the level of sticky contaminants associated with the fibers.

2. The method of claim 1 wherein the pressure is above about 60 atmospheres and the temperature is above about 25° C.

3. The method of claim 2 wherein the pressure is above about 73 atmospheres and the temperature is above about 31° C.

4. The method of claim 3 wherein the pressure is less than about 300 atmospheres and the temperature is less than about 150° C.

5. The method of claim 4 wherein the pressure is between about 80 atmospheres and about 200 atmospheres and wherein the temperature is between about 31° C. and about 90° C.

6. The method of claim 1 wherein the supercritical or near supercritical carbon dioxide is flowed through the secondary fibers and wherein the rate of flow is between about 0.01 standard liters per minute per gram of dry secondary fiber and about 10.0 standard liters per minute per gram of dry secondary fiber.

7. The method of claim 6 wherein the rate of flow is between about 0.1 standard liters per minute per gram of dry secondary fiber and about 1.0 standard liters per minute per gram of dry secondary fiber.

8. The method of claim 6 wherein the supercritical or near supercritical carbon dioxide is flowed through the secondary fibers for between about one minute and about three hours.

9. The method of claim 8 wherein the supercritical or near supercritical carbon dioxide is flowed through the secondary fibers for between about 3 minutes and about one hour.

10. The method of claim 1 wherein the ratio of grams of supercritical or near supercritical carbon dioxide to the grams of dry secondary fiber is between about 10 and about 200.

11. The method of claim 1 wherein the sticky contaminants comprise an adhesive,

12. The method of claim 1 wherein the sticky contaminants comprise a tackifier.

13. The method of claim 1 wherein the sticky contaminants are selected from the group consisting of polyvinyl acetate polymers, polyvinyl acetate copolymers, ethylene vinyl acetate polymers, ethylene vinyl acetate copolymers, polystyrene, styrenebutadiene polymers, polypropylene, polyethylene, polyamide, rubber compounds, wax, and mixtures thereof.

14. The method of claim 1 wherein the level of sticky contaminants in the cellulose-containing secondary fibers is reduced prior to de-inking of the fibers.

15. The method of claim 1 wherein the level of sticky contaminants in the cellulose-containing secondary fibers is reduced prior to bleaching of the fibers.

* * * * *

UNITED STATES PATENT AND TRADEMARK OFFICE
CERTIFICATE OF CORRECTION

PATENT NO. : 5,009,746
DATED : April 23, 1991
INVENTOR(S) : Shafi U. Hossain and Carol A. Blaney It is certified that error appears in the above-indentified patent and that said Letters Patent is hereby corrected as shown below:

Column 1, line 54, "paper" should read --papers--;

Column 5, line 47, "a the" should read --as the--;

Column 6, line 65, "achieved" should read --acheive--;

Column 7, line 15, "I" should read --It--;

Column 7, line 20, "wa" should read --was--;

Column 7, line 52, "t" should read --to--;

Column 8, line 54, "adhesive," should read --adhesive.--

Signed and Sealed this

Third Day of May, 1994

Attest:

BRUCE LEHMAN

Attesting Officer

Commissioner of Patents and Trademarks